(12) United States Patent
Foster et al.

(10) Patent No.: US 8,531,300 B2
(45) Date of Patent: Sep. 10, 2013

(54) SYSTEM AND METHOD FOR TRACKING A COTTON MODULE

(75) Inventors: Christopher A. Foster, Denver, PA (US); Justin R. Ringwald, Ellinwood, KS (US); Thomas H. Brown, Jr., Reinholds, PA (US); Jesse H. Orsborn, Warsaw, MO (US); Trent A. Haggard, Milwaukee, WI (US); Douglas S. Fitzkee, Ephrata, PA (US); Kevin S. Richman, Plainfield, IL (US); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 266 days.

(21) Appl. No.: 13/161,966

(22) Filed: Jun. 16, 2011

(65) Prior Publication Data

US 2012/0319837 A1   Dec. 20, 2012

(51) Int. Cl.
*G08B 13/14* (2006.01)

(52) U.S. Cl.
USPC ............. 340/572.8; 340/572.1; 340/539.32; 340/539.1

(58) Field of Classification Search
USPC ............. 340/539.32, 539.1, 572.1, 572.8; 53/461; 100/14; 56/10.2 R, 341, 350–353; 701/50, 532; 705/1.1
See application file for complete search history.

(56) References Cited

U.S. PATENT DOCUMENTS

| | | | |
|---|---|---|---|
| 5,845,229 A | 12/1998 | Rawlins | |
| 6,563,417 B1 | 5/2003 | Shaw | |
| 6,614,392 B2 | 9/2003 | Howard | |
| 6,691,135 B2 | 2/2004 | Pickett et al. | |
| 7,034,683 B2 | 4/2006 | Ghazarian | |
| 7,082,740 B2 | 8/2006 | van der Lely | |
| 7,085,777 B2 | 8/2006 | Beck et al. | |
| 7,250,858 B2 | 7/2007 | Schmidtberg et al. | |
| 7,313,549 B2 | 12/2007 | Hudson | |
| 7,336,181 B2 | 2/2008 | Nowak et al. | |
| 7,394,372 B2 | 7/2008 | Gloekler et al. | |
| 7,397,358 B2 | 7/2008 | Boothroyd | |
| 7,415,924 B2 * | 8/2008 | Roberts | 100/102 |
| 7,434,375 B2 * | 10/2008 | Pickett et al. | 53/450 |
| 2005/0107934 A1 | 5/2005 | Gudat et al. | |
| 2007/0181469 A1 | 8/2007 | Stover | |
| 2008/0052876 A1 | 3/2008 | Stover | |
| 2008/0117023 A1 | 5/2008 | Wilcox et al. | |
| 2008/0143482 A1 | 6/2008 | Shoarinejad et al. | |
| 2008/0252459 A1 | 10/2008 | Butler et al. | |

\* cited by examiner

*Primary Examiner* — Steven Lim
*Assistant Examiner* — Hongmin Fan
(74) *Attorney, Agent, or Firm* — Rebecca Henkel

(57) ABSTRACT

A system and method for automatically identifying and locating a cotton module that has been transported prior to marking with an identifier, such system and method locating the cotton module as a function of a location of the cotton module and a heading of an unloading vehicle.

25 Claims, 13 Drawing Sheets

RECORD
COTTON MODULE IDENTIFIER

PLANTING, GROWING & HARVESTING INFORMATION

SEEDJTYPE   YIELD DATA AT TIME OF HARVEST   MOISTURE CONTENT
TIMING AND QUANTITY OF ONE OR MORE CHEMICALS OR FERTILIZERS
AREA OF THE FIELD FROM WHICH COTTON MODULE WAS HARVESTED

TRACKING AND POSSESSION HISTORY

| HARVESTING VEHICLE ID | OPERATOR ID | UNLOADING LOCATION | VEHICLE HEADING | UNLOADING TIME & DATE | COMMENTS |
|---|---|---|---|---|---|
| TRANSPORT VEHICLE ID | OPERATOR ID | LOADING LOCATION | VEHICLE HEADING | LOADING TIME & DATE | COMMENTS |
| TRANSPORT VEHICLE ID | OPERATOR ID | UNLOADING LOCATION | VEHICLE HEADING | UNLOADING TIME & DATE | COMMENTS |

• • •

| TRANSPORT VEHICLE ID | OPERATOR ID | LOADING LOCATION | VEHICLE HEADING | LOADING TIME & DATE | COMMENTS |
|---|---|---|---|---|---|
| TRANSPORT VEHICLE ID | OPERATOR ID | UNLOADING LOCATION | VEHICLE HEADING | UNLOADING TIME & DATE | COMMENTS |

LOCATION OF RFID TAG

PROCESSING AND CLASSIFICATION INFORMATION

PROCESSING FACILITY   YIELD DATA AT THE PROCESSING FACILITY
SEED COTTON WEIGHT   LINT WEIGHT              COTTON GRADE
COTTON COLOR              UNIFORMITY              TRASH CONTENT
COTTON FIBER DIAMETER                          COTTON FIBER STRENGTH

FIG. 9

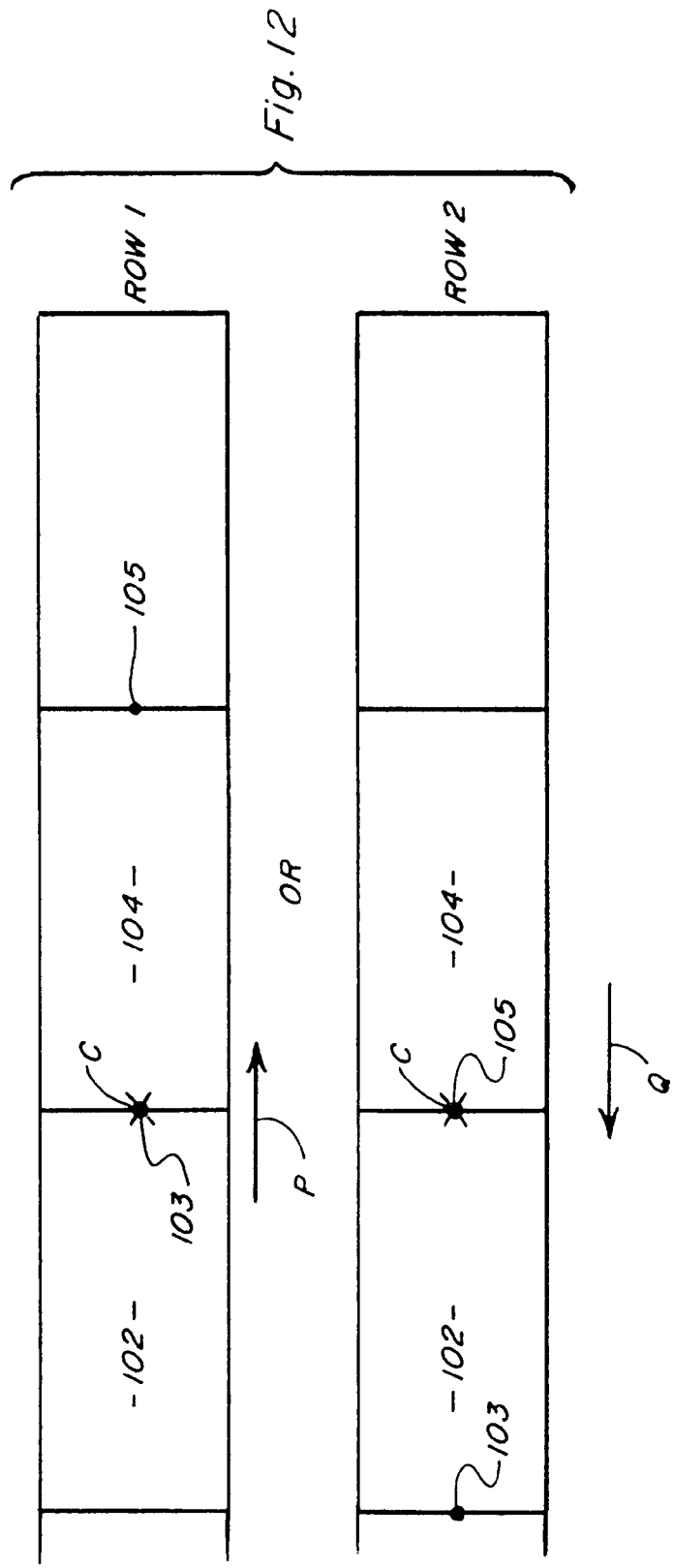

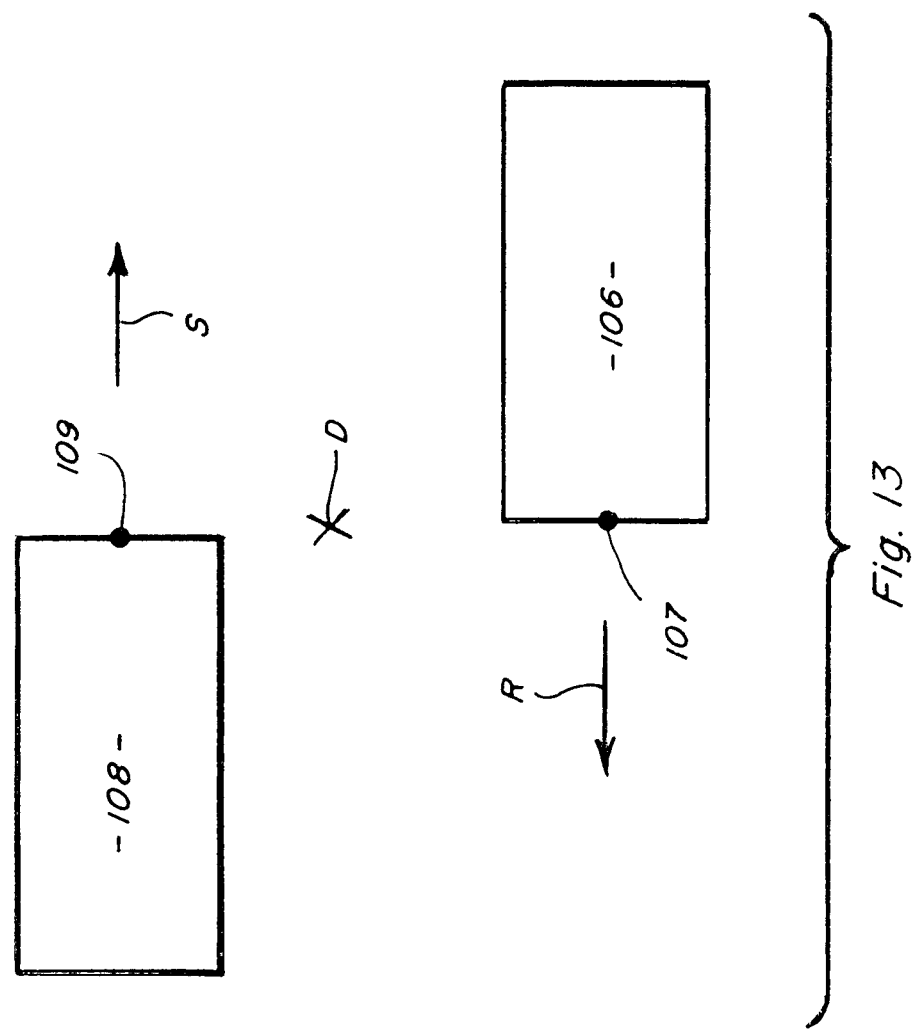

SYSTEM AND METHOD FOR TRACKING A COTTON MODULE

TECHNICAL FIELD

This invention relates generally to tracking a cotton module after harvesting, and more specifically to a system and method for automatically identifying and locating a cotton module that has been transported prior to marking with an identifier, such system and method locating the cotton module as a function of a location of the cotton module and a heading of an unloading vehicle.

BACKGROUND ART

Cotton harvesters including on-board cotton module builders are typically used to create cotton modules having a generally rectangular shape, conforming to specific dimensions to facilitate handling and transporting on dedicated transport vehicles and processing by gins. The most accepted and recognized of the known on-board cotton module builders utilize an accompanying unloading door or ramp, which unfolds as the cotton module builder is tilted, for providing a continuous, level surface extending from the floor of the builder to the ground or other surface onto which the cotton module is to be unloaded. The cotton module is moved along the ramp by a suitable driver system which may include one or more independently controllable powered drag chains, belts, rollers, or the like. Typically the unloading ramp is used in conjunction with a sensing system that identifies the position of the cotton module along the ramp as it is unloading.

Usually the cotton modules are unloaded by the harvester in or near the swath of field from which the cotton was harvested. At a later time a transport vehicle collects the cotton modules and transports them from their various locations in the field and unloads them in a common location to await transport to a cotton gin for further processing. It is not uncommon for a cotton module to be transported several times prior to reaching the gin. Because cotton modules may be left in the field for an extended period of time, it is usually desirable to cover the cotton module with a water resistant or waterproof cover. This cover can protect the cotton module from wind and rain and also help maintain the integrity of the cotton module during transport at high speeds.

To improve crop yield and quality, it is desirable to be able to record, correlate, and analyze information associated with a crop at various phases of production, such as planting, growing, harvesting, transporting, processing, or classifying. A farmer can analyze the collected information and use it in the decision making process through the current season and future seasons. Planting, growing, and harvesting information of interest may include seed type, seed quantity, timing and quantity of chemicals and fertilizer applied to the crop, time of harvest, yield data at time of harvest, moisture content, area of the field from which the crop is harvested, and the like. Processing and classifying information of interest may include identification of the processing facility, processing start time, processing end time, yield data at the processing facility, seed cotton weight, lint weight, grade, color, fiber diameter, fiber strength, uniformity, trash content, storage location, and the like.

It is also desirable to record, correlate, and analyze information associated with transporting the cotton modules. This information can be used to create a possession history, and may be helpful in determining the effectiveness of equipment, efficiency and timeliness of vehicle, operators, and the like. The possession history may also provide information for determining ownership and/or liability for damage that may occur to the cotton module during transport from field to processing facility. Transporting information of interest may include identification of the harvesting vehicle, identification of the transport vehicle(s), identification of an operator, time of unloading from the harvester, time of loading on the transport vehicle, time of unloading from the transport vehicle, and the like.

To facilitate the collection of information for analysis, the cotton modules are typically marked with an identifier. A dedicated crew, sometimes the same crew responsible for covering the cotton modules, will write the identifier directly on the cotton module or on a tag that is manually attached to the cotton module or cotton module cover. During harvesting, one crew may be responsible for marking cotton modules from several harvesters working in the field. In some instances the cotton module may be transported from the initial location in the field to another location prior to marking. Often the crew uses global positioning system (GPS) coordinates of the harvester and/or the transport vehicle at unloading to locate the cotton module and associate the correct identifier therewith.

This system is labor intensive and prone to human error, particularly if the cotton module is transported from its initial location prior to marking. Two unmarked cotton modules from different areas of the field, or from different fields, may be transported and unloaded end to end in another location. According to GPS coordinates alone, these cotton modules may be mistaken for each other and tagged improperly. The record of information associated with these cotton modules would be in error and any future decisions made would be based on incorrect information.

Accordingly, what is sought is a system and method for automatically identifying and locating a cotton module that has been transported prior to marking with an identifier, which overcomes at least one of the problems, shortcomings or disadvantages as set forth above.

SUMMARY OF THE INVENTION

What is disclosed is a system and method for automatically identifying and locating a cotton module that has been transported prior to marking with an identifier, which overcomes at least one of the problems, shortcomings or disadvantages as set forth above.

According to the present invention, a cotton module of harvested cotton, unloaded from a harvesting vehicle and transported by at least one transport vehicle prior to marking, is identified, located and marked with a data tag. The data tag includes an identifier that associates the cotton module with a record of data associated with the cotton module. A preferred embodiment of the system and method of the invention includes a location system, a communication network apparatus, and an identification system.

The location system automatically determines a heading of the vehicle and a location for the cotton module each time the cotton module is unloaded and loaded. According to a preferred feature of the invention, the location system includes a ground positioning system (GPS), and the location is defined in GPS coordinates. In addition, the heading of the vehicle may be determined from differential GPS readings in a well known manner.

According to another preferred feature of the invention, the location of the cotton module refers to a location of a predetermined reference point of the cotton module, and the predetermined reference point is a function of the heading of the vehicle from which the cotton module is unloaded.

The communication network apparatus preferably includes at least one processor programmed to communicate with the harvesting vehicle, the at least one transport vehicle, the location system, and a user through a user interface. The programming will further automatically assign an identifier to the cotton module when unloaded from the harvesting vehicle, develop a record of information related to the cotton module including at least the identifier and the information from the location system, store the record in a database, and output the information.

The identification system preferably includes at least one reader in communication with a data tag. The identification system communicates with the communication network apparatus, stores at least the identifier on the data tag, locates the cotton module as a function of the information from the location system, and associates the data tag with the cotton module.

According to a preferred aspect of the invention the data tag is carried on, attached to, or embedded in the cotton module.

According to another preferred aspect of the invention, the data tag is carried on or attached to a cotton module cover.

Preferred apparatus for the reader and the data tag may include radio frequency identification technology, such as a radio frequency transceiver and a radio frequency transponder, respectively. When the transceiver interrogates the transponder, the transponder responds by outputting the information stored thereon. Upon interrogation, the transponder responds with at least the identifier of the associated cotton module, and the identifier can be used to obtain record information from the communication network apparatus.

According to yet another preferred aspect of the invention, the at least one reader is further operable to store the record of information on the data tag. In this situation, the record data is available without accessing the communication network apparatus.

Preferably, the record includes at least the identifier and the information from the location system. According to a preferred feature of the invention, the record further includes information associated with the cotton module including at least some of: seed type, timing and quantity of one or more chemicals or fertilizers applied, time of harvest, yield data at time of harvest, moisture content, and harvesting location.

According to another preferred feature of the invention, the record further includes information associated with processing and classifying the cotton module and cotton processed therefrom including at least some of: identification of a processing facility, yield data at the processing facility, seed cotton weight, lint weight, cotton grade, cotton color, cotton fiber diameter, cotton fiber strength, uniformity, trash content, and the like.

According to yet another preferred feature of the invention, the record further includes a tracking and possession history of the cotton module developed by including information representative of identification of the vehicle from which the cotton module is unloaded and time of unloading with information from the location system for each time the cotton module is unloaded and information representative of identification of the vehicle on which the cotton module is loaded and time of loading with information from the location system for each time the cotton module is loaded, respectively.

According to yet another preferred feature of the invention, the user may augment the record with comments or observations prior to loading or after unloading the cotton module.

The present invention is particularly advantageous for identifying and locating cotton modules that have been transported prior to marking or tagging. If unmarked cotton modules from different areas of the field, or from different fields, are transported and unloaded end to end in another location, the desired cotton module can be identified with more certainty because the cotton module is tracked and located as a function of the record of the locations of the cotton module and the headings of the vehicles from which the cotton module was unloaded.

BRIEF DESCRIPTION OF THE DRAWINGS

FIG. 9 is an exemplary Record that may be developed according to the invention;

FIG. 12 is an enlarged portion of a top view of a row of cotton modules for illustrating an advantage of the present invention; and FIG. 13 is an enlarged portion of the field illustrating another one of the advantages of the present invention.

DETAILED DESCRIPTION OF THE INVENTION

Figure 1:
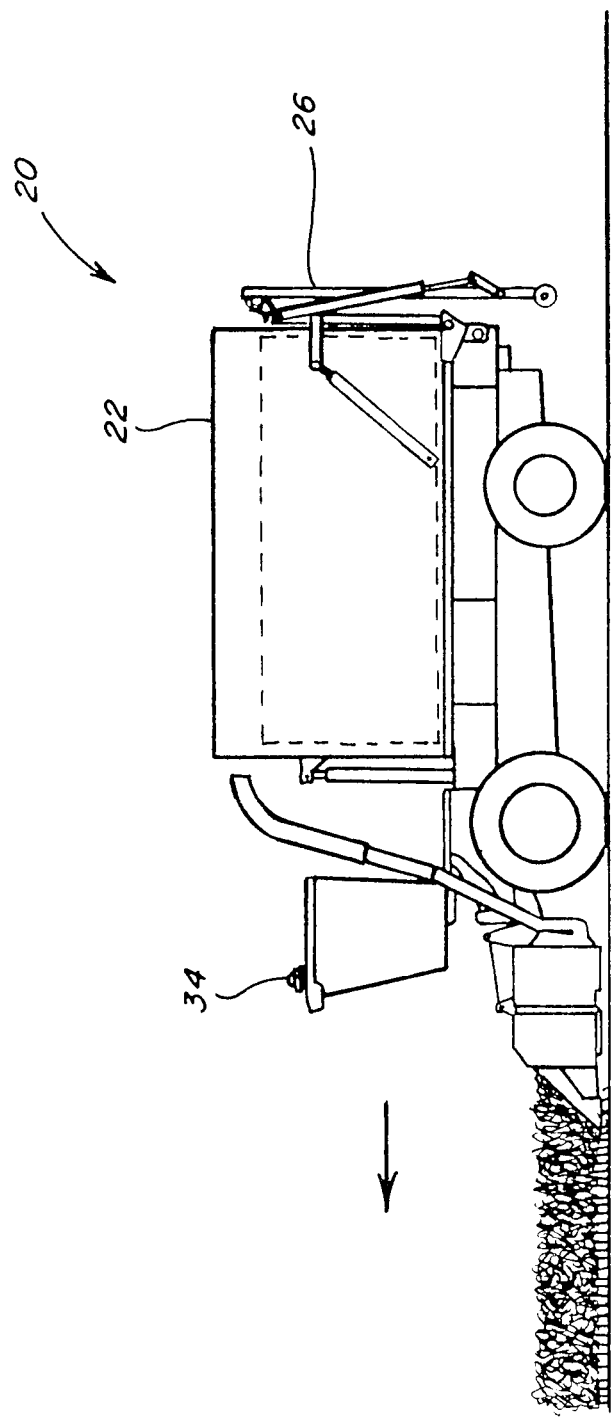
FIG. 1 is a simplified side view of a representative cotton harvesting vehicle having an on-board cotton module builder including a foldable unloading door arrangement in a harvesting position.
Figure 2:
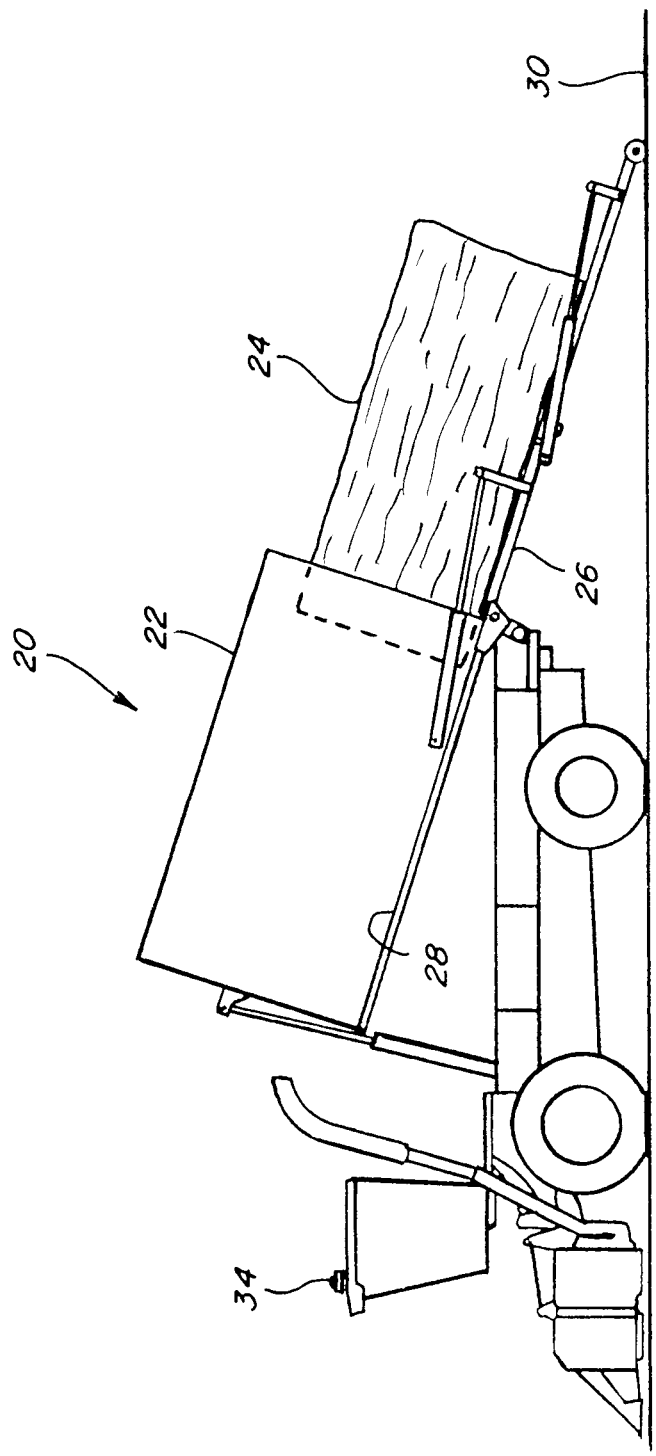
FIG. 2 is another simplified side view of the harvesting vehicle with the cotton module builder tilted and the unloading door unfolded to an unloading position.
Figure 3:
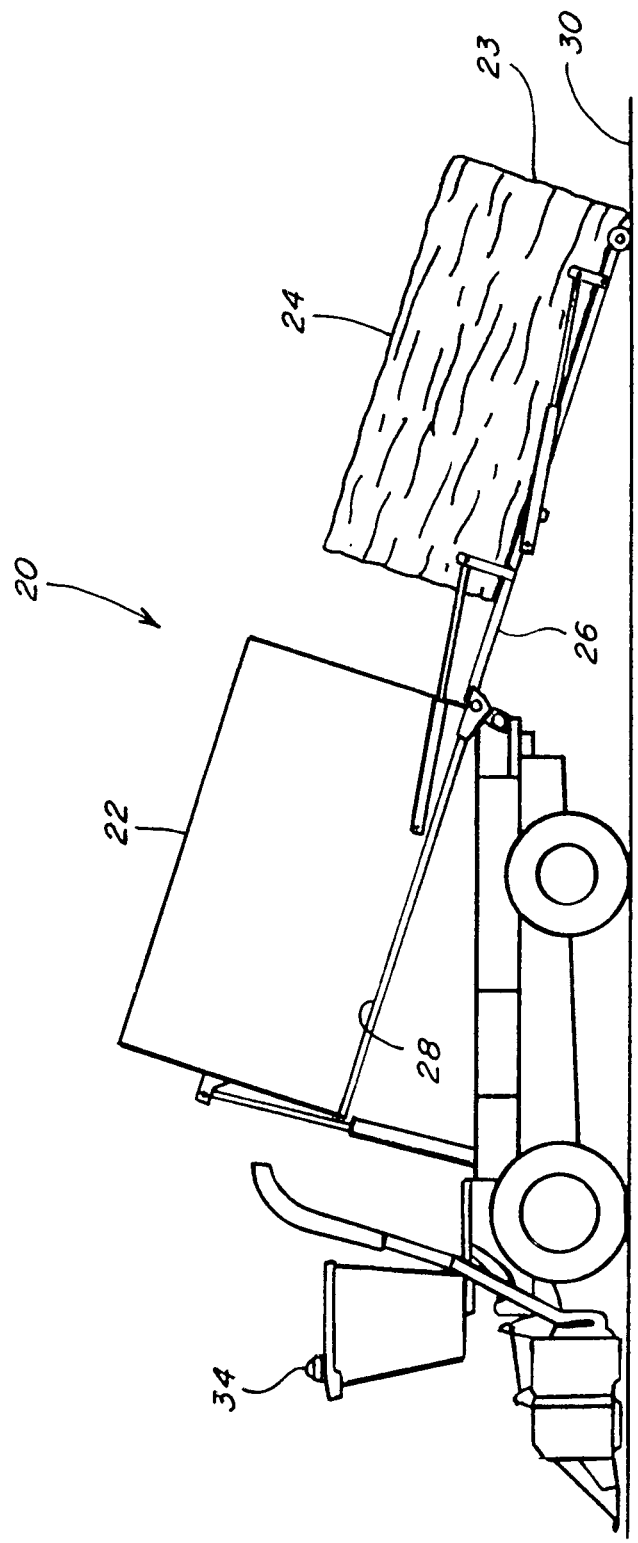
FIG. 3 is yet another simplified side view of the harvesting vehicle with the cotton module builder tilted and the unloading door unfolded to an unloading position.
Figure 4:
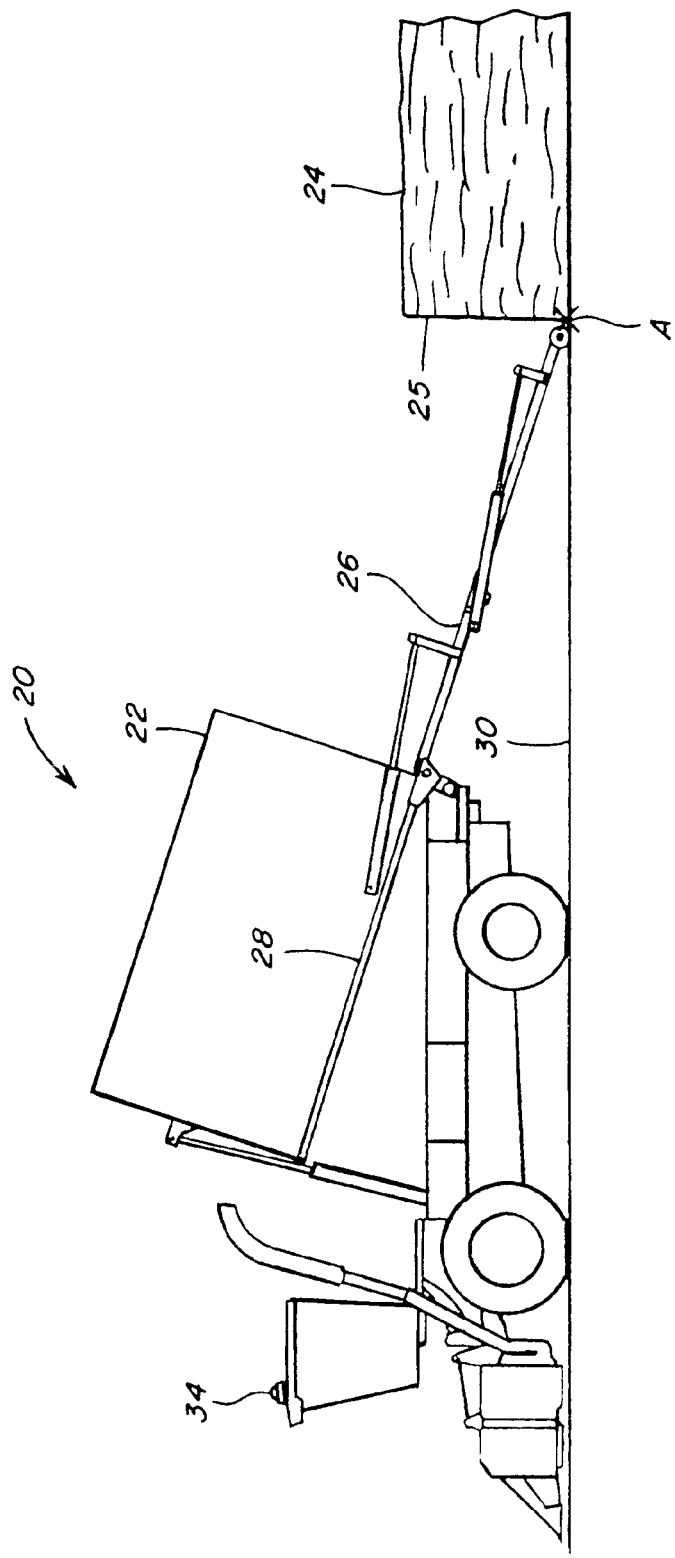
FIG. 4 is yet another simplified side view of the harvesting vehicle with the cotton module builder tilted and the unloading door unfolded to an unloading position.
Figure 5:
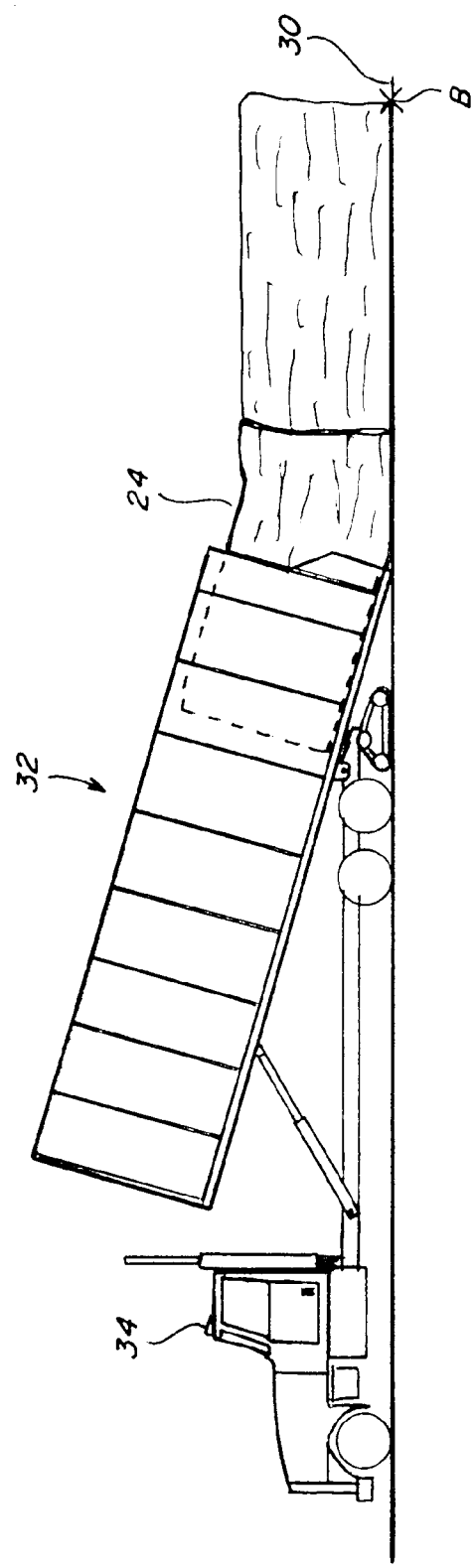
FIG. 5 is a simplified side view of a cotton module transport vehicle in the loading/unloading position.

Turning now to the drawings, wherein FIGS. 1 through 4 depict a representative cotton harvesting vehicle 20 including an on-board cotton module builder 22 of well-known construction and operation. An unloading door or ramp 26 unfolds as cotton module builder 22 is tilted to provide a continuous level surface from a floor 28 of cotton module builder 22 to a surface 30 onto which a cotton module 24 is to be unloaded. Cotton module 24 is moved along ramp 26 by a suitable driver system (not shown) which may include one or more independently controllable powered drag chains, belts, rollers, or the like. FIG. 5 depicts a representative cotton module transport vehicle 32, also of well-known construction and operation, suitable for collecting and transporting cotton module 24. Harvesting vehicle 20 and transport vehicle 32 include a system for determining the position or progress of cotton module 24 during loading and unloading. For example changes in the force exerted on one or more drag chains of the driver may be monitored to determine the location of cotton module 24 along unloading ramp 26. After unloading, the system provides a location for the cotton module and assists in positioning transport vehicle 32 for loading cotton module 24 from a known location. Such systems are well known and may provide information to determine when a first end 23 of cotton module 24 is unloaded, when a last end 25 of cotton module 24 is unloaded, or both.

Figure 6:
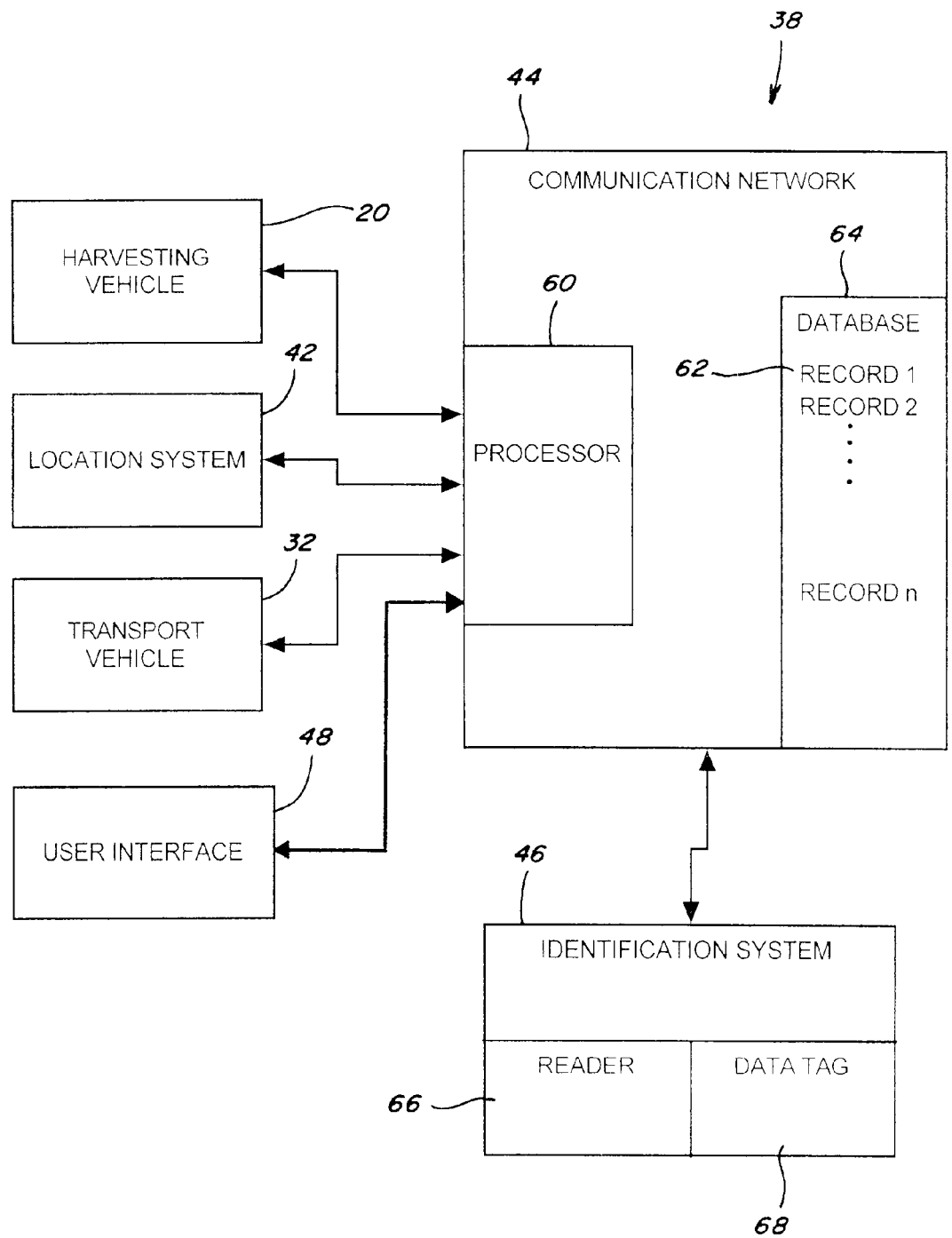
FIG. 6 is a simplified schematic representation of a preferred embodiment of the system of the present invention.

According to the present invention, cotton module 24, unloaded from harvesting vehicle 20 and transported by at least one transport vehicle 32 prior to marking or tagging, is identified, located, and marked. A system 38 and a method 40 of the present invention are illustrated schematically and diagrammatically in FIGS. 6 and 7-8, respectively. According to a preferred embodiment of the invention, system 38 includes a location system 42, a communication network apparatus 44, and an identification system 46.

Figure 7:
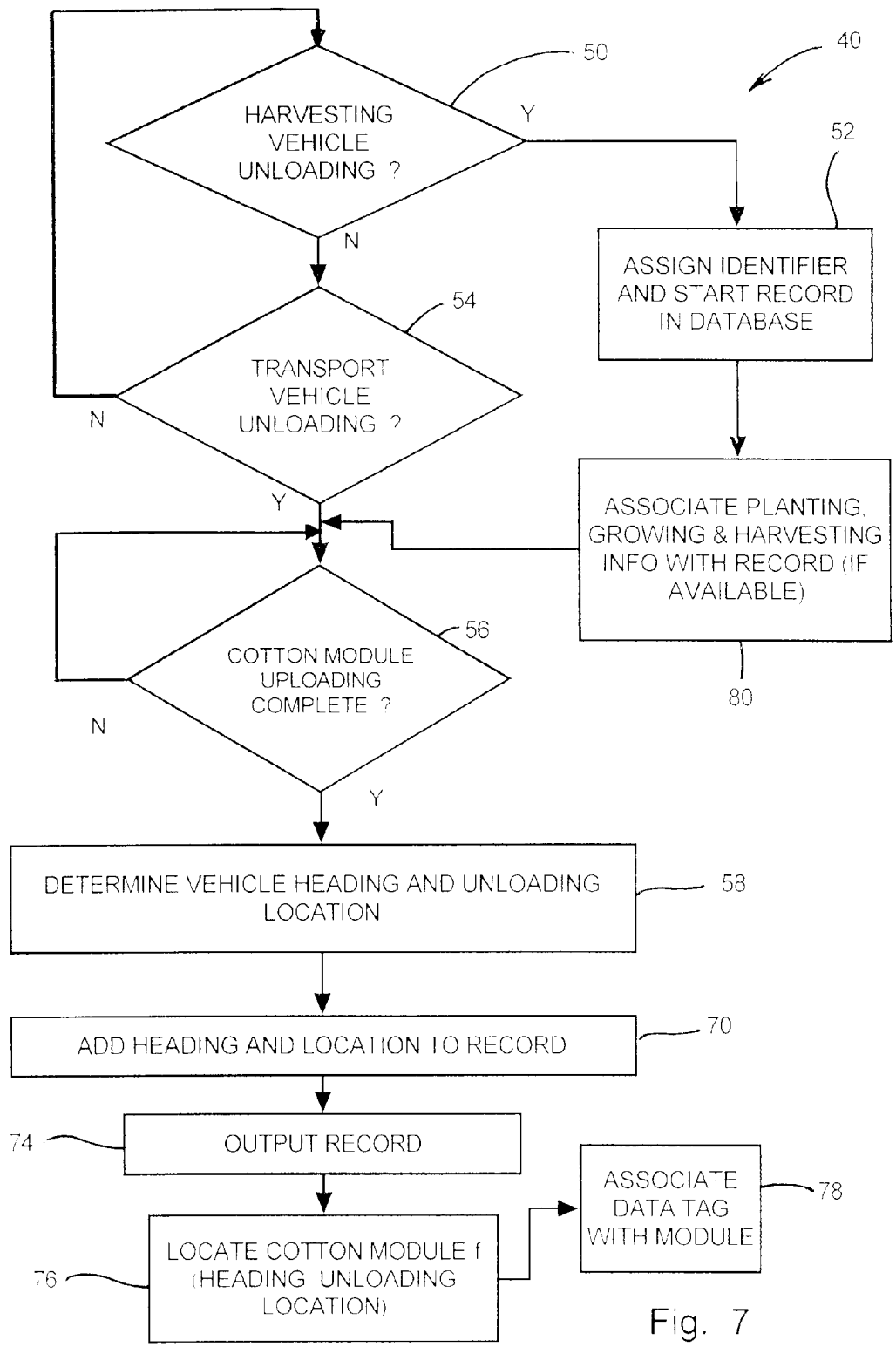
FIG. 7 is a simplified flow diagram of a preferred embodiment according to the present invention.

Location system 42 is preferably configured and operable to automatically determine information representative of a heading of harvesting vehicle 20 and transport vehicle 32 and a location for cotton module 24 each time cotton module 24 is unloaded therefrom and loaded onto, respectively. With reference to FIG. 7, the flow diagram for method 40 includes determining vehicle heading and location at block 58 after confirming that cotton module 24 has been unloaded at decision block 56 by either transport vehicle 32 or harvesting vehicle 20 at decision blocks 54 and 50, respectively. When loading cotton module 24, location system 42 identifies the cotton module to be loaded using the location of the cotton module and the heading of the previous unloading vehicle. Once loaded, location system 42 determines information representative of the heading of the transport vehicle as seen at blocks 84, 86, and 88 of FIG. 8.

According to a preferred feature of the invention, location system 42 includes a ground positioning system (GPS) depicted by GPS antenna 34 in FIGS. 1 through 5, and the cotton module location is defined in GPS coordinates. In addition, the heading of harvesting vehicle 20 and transport vehicle 32 may be determined from differential GPS readings in a well known manner.

According to another preferred feature of the invention, the location of cotton module 24 refers to a location of a predetermined reference point of cotton module 24, and the predetermined reference point is a function of the heading of the vehicle from which cotton module 24 is unloaded. For example, a non-limiting representative reference point, denoted A, is shown at a last end unloaded 25, driver's side corner in FIG. 4. As another example, FIG. 5 shows a reference point, denoted B, at a first end unloaded 23, driver's side corner. The predetermined reference point need not be at a corner of cotton module 24. Other non-limiting possibilities (not shown) include a center of cotton module 24 or a center point on either end of cotton module 24.

Communication network apparatus 44 preferably includes at least one processor 60 programmed to communicate with harvesting vehicle 20, the at least one transport vehicle 32, location system 42, and a user through a user interface 48. Processor 60 is further programmed to automatically assign an identifier to cotton module 24 when unloaded from harvesting vehicle 20 and develop a record 62 of information related to cotton module 24 as shown at blocks 52 and 70, store record 62 in a database 64, and output the information in record 62 as shown at block 74. Database 64 of FIG. 6 includes RECORD 1, RECORD 2 ... RECORD n which refer to records created and developed for previously or subsequently unloaded, loaded, or transported cotton modules. Record 62 preferably includes at least the identifier and the information from the location system.

Identification system 46 includes at least one reader 66 configured and operable to communicate with a data tag 68. Additionally, identification system 46 is configured and operable to communicate with communication network apparatus 44, store at least the identifier on data tag 68, and locate cotton module 24 as a function of the information from location system 42 as shown at block 76. Finally, data tag 68 is associated with cotton module 24 as shown in block 78.

According to a preferred aspect of the invention, data tag 68 is associated with cotton module 24 by being carried on, attached to, or embedded in cotton module 24.

According to another preferred aspect of the invention, data tag 68 is associated with cotton module 24 by being carried on or attached to a cotton module cover (not shown).

Preferred apparatus for the at least one reader 66 and data tag 68 may include radio frequency technology, such as a radio frequency transceiver and a radio frequency transponder, respectively. When the reader 66, or transceiver, interrogates the transponder, the transponder responds by outputting the information stored thereon. Upon interrogation, the data tag 68, or transponder, responds with at least the identifier of the associated cotton module, and the identifier can be used to obtain record information from communication network apparatus 44.

According to yet another preferred aspect of the invention, the at least one reader 66 is further operable to store record 62 of information on data tag 68. In this situation, the information or data associated with record 62 is available without accessing the communication network apparatus.

According to a preferred feature of the invention, record 62 may further include information associated with cotton module 24 during planting, growing, and harvesting. Such information may be entered at user interface 48 or transferred to communication network apparatus 44 in another manner prior to or during harvesting and associated with record 62 of cotton module 24 after the identifier is assigned as shown at block 80. Information of interest may include least some of: seed type, timing and quantity of one or more chemicals or fertilizers applied, time of harvest, yield data at time of harvest, moisture content, and harvesting location.

Figure 8:
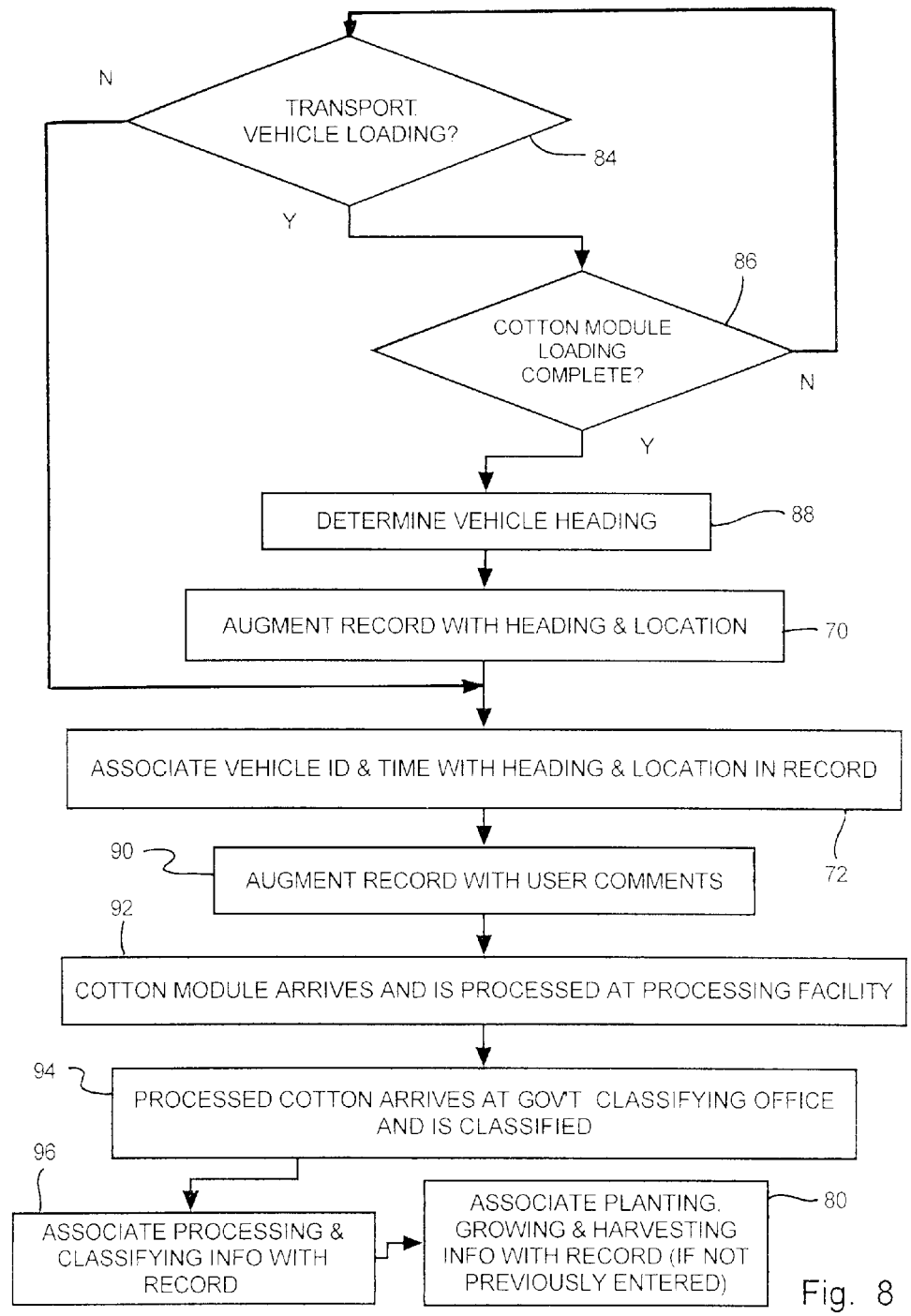
FIG. 8 is a continuation of the simplified flow diagram of FIG. 7.

According to another preferred feature of the invention, record 62 further includes information associated with processing and classifying cotton module 24 and the cotton processed therefrom. Again this information may be entered at user interface 48 or transferred to communication network apparatus 44 in another manner. Turning to FIG. 8, this information is associated with record 62 at block 96 after cotton module 24 is processed, and the processed cotton is classified as shown at blocks 92 and 94, respectively. Information of interest may include at least some of: identification of a processing facility, yield data at the processing facility, seed cotton weight, lint weight, cotton grade, cotton color, cotton fiber diameter, cotton fiber strength, uniformity, trash content, and the like.

According to yet another preferred aspect of the invention, record 62 further includes information representative of identification of harvesting vehicle 20, identification of transport vehicle(s) 32, time of loading cotton module 24, and time of unloading cotton module 24 for each time cotton module 24 is loaded and unloaded as shown in block 72 of FIG. 8. In the context of this invention, identification of the vehicle may encompass both identification of the vehicle and an operator of the vehicle as seen in FIG. 9. Also with reference to FIG. 9, unloading and loading time includes time and/or date.

According to yet another preferred feature of the invention, record 62 further includes a tracking and possession history of cotton module 24 developed by associating information representative of identification of the vehicle from which cotton module 24 is unloaded and time of unloading with information from location system 42 for each time the cotton module is unloaded and information representative of identification of the vehicle on which cotton module 24 is loaded and time of loading with information from location system 42 for each time the cotton module is loaded, respectively. Again, in the context of this invention, identification of the vehicle may encompass both identification of the vehicle and an operator of the vehicle as seen in FIG. 9. Also with reference to FIG. 9, unloading and loading time includes time and/or date.

According to yet another preferred feature of the invention, the user may augment record 62 with comments or observations made while handling cotton module 24 as seen at block 90 of FIG. 8. These observations may include damage to cotton module 24, loss of the cotton module cover, existence of harsh weather conditions, and the like.

Figure 10:
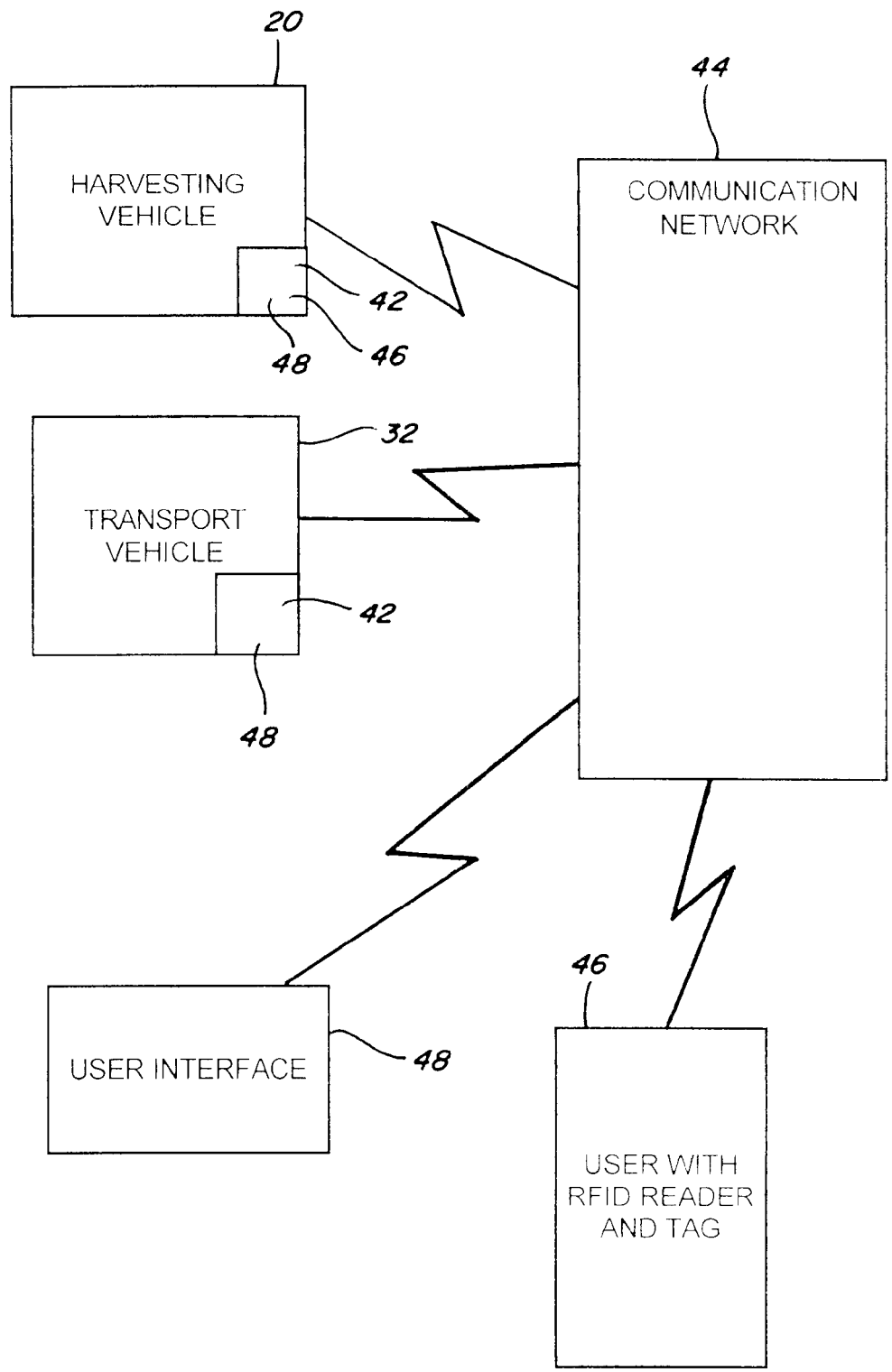
FIG. 10 is another simplified schematic representation of a preferred aspect of the invention.

FIG. 10 illustrates another preferred embodiment of the invention in which the computational activities of system 38 have been redistributed. For example, an on-board computer of harvesting vehicle 20 or transport vehicle 32 may include user interfaces 48 and may act as location system 42 by processing GPS signals and determining the vehicle heading and location of cotton module 24. In addition, the on-board computer of harvesting vehicle 20 may act as identification system 46 by assigning the identifier when cotton module 24 is unloaded. It is also contemplated that these systems will have the capability to communicate wirelessly.

Figure 11:
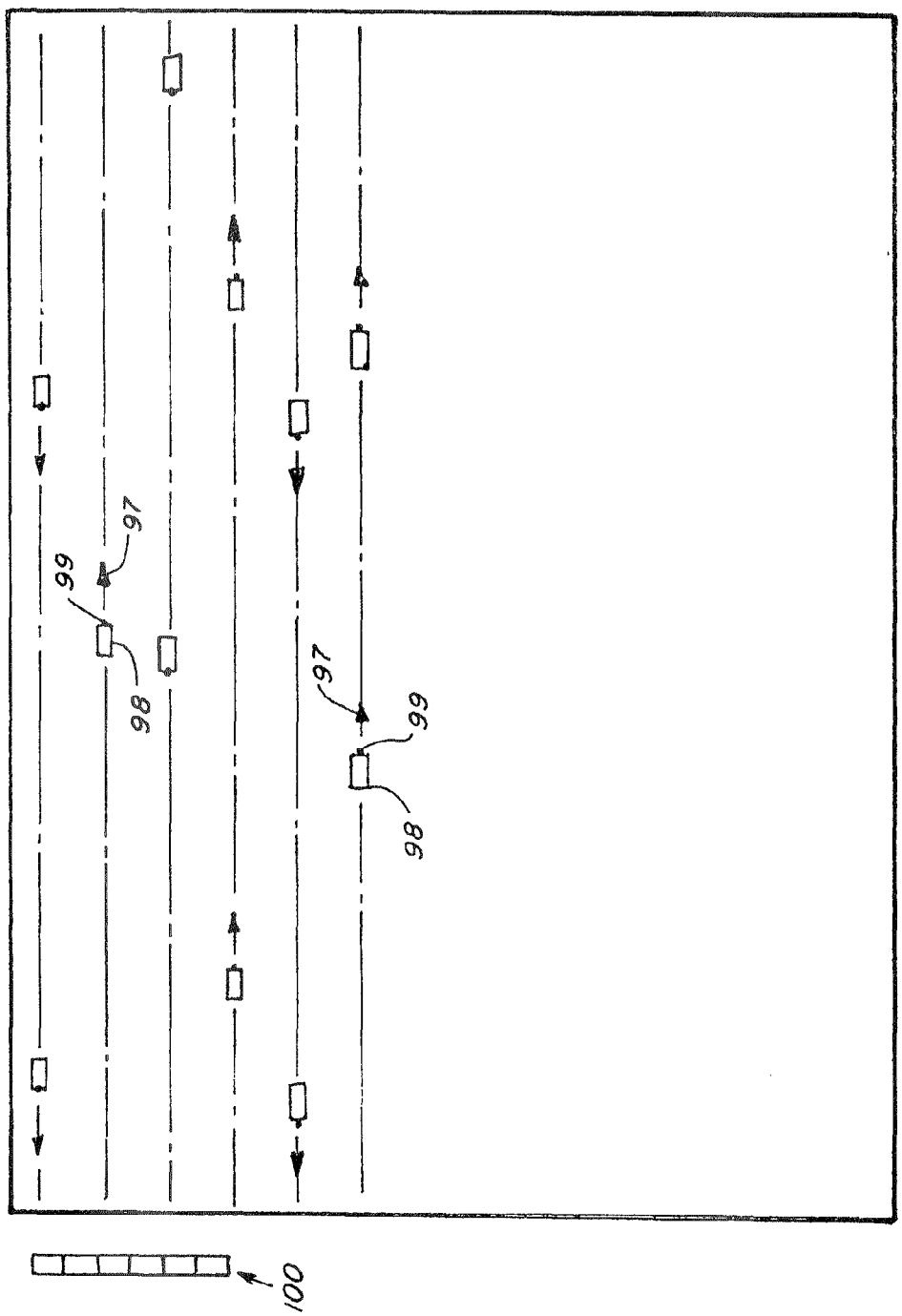
FIG. 11 is a top view of a portion of a cotton field including a row of cotton modules and unloaded cotton modules in the field.

FIGS. 11 through 13 are useful for illustrating some of the advantages of the present invention. FIG. 11 is a top view of a portion of a harvested field. Cotton modules 98 have been unloaded from one or more harvesting vehicles, and a row of cotton modules 100, transported by one or more transport vehicles, is shown at a headland of the field. The heading of the harvesting vehicle associated with each cotton module 98 is represented by arrows 97 near each cotton module. The location of each cotton module 98 is defined as last end unloaded, center, denoted by a dot 99 on each cotton module.

FIG. 12 illustrates an advantage of the present invention in the situation when cotton modules 102 and 104 are transported from one or more fields or one or more areas of a field and unloaded end to end prior to marking, or association with data tag 68. Identification of the cotton module at GPS coordinates X denoted by C results in uncertainty between cotton modules 102 and 104. This uncertainty can be eliminated, however, by accessing the record of information developed for cotton modules 102 and 104. Cotton module 102 can be identified as the cotton module with location 103 at GPS coordinates C unloaded by the vehicle having a heading represented by an arrow denoted P corresponding to ROW 1 of FIG. 12. Cotton module 104 can be identified as the cotton module with location 105 at GPS coordinates C unloaded by the vehicle having a heading represented by an arrow denoted Q corresponding to ROW 2 of FIG. 12. Based on location and unloading vehicle heading, the cotton module may be identified and marked or tagged with more certainty.

FIG. 13 illustrates another advantage of the present invention in the situation where variations or error margins between various GPS systems create uncertainty between cotton modules in the same vicinity. Identification of the cotton module at GPS coordinates X denoted by D results in uncertainty between cotton modules 106 and 108 because both modules are nearby, but neither module is located at GPS coordinates D. This uncertainty can be reduced, however, by accessing the record of information developed for cotton modules 106 and 108. Cotton module 106 can be identified as the cotton module with location 107 unloaded by the vehicle having a heading represented by an arrow denoted S, while cotton module 108 can be identified as the cotton module with location 108 unloaded by the vehicle having a heading represented by an arrow denoted R. Based on location and unloading vehicle heading, the cotton module may be identified and marked or tagged with more certainty As discussed above, by accessing the information developed in the record, the user can identify and locate for marking an unmarked cotton module as a function of the information representative of locations of the cotton module and the headings of the vehicles from which the cotton module was unloaded. The present invention is particularly advantageous when the cotton module has been transported one or more times prior to marking because it reduces the uncertainty encountered when using GPS coordinates alone for identifying cotton modules. In addition, information associated with a crop at various phases of production, such as planting, growing, harvesting, transporting, processing, or classifying can be recorded, correlated, and analyzed for future decision making. Collected data can additionally be used to create a possession and tracking history which may be helpful in determining the effectiveness of equipment, efficiency and timeliness of vehicles, operators, and the like. The possession history may also provide information for determining ownership and/or liability for damage that may occur to the cotton module during transport from field to processing facility.

It will be understood that the foregoing description is for preferred embodiments of this invention and that the invention is not limited to the specific forms shown. Other modifications may be made in the design and arrangement of other elements without departing from the scope of the invention as expressed in the appended claims.

What is claimed is:

1. A system for identifying and locating a cotton module of harvested cotton unloaded from a harvesting vehicle and transported by at least one transport vehicle prior to physically marking the cotton module with an identifier, comprising:

location system configured and operable to automatically determine information representative of a heading of the harvesting vehicle, a heading of the transport vehicle, and a location of the cotton module each time the cotton module is unloaded therefrom and loaded onto, respectively;

communication network apparatus including at least one processor programmed to communicate with the harvesting vehicle, the at least one transport vehicle, the location system, and a user through a user interface, and to automatically: a) assign an identifier to the cotton module when unloaded from the harvesting vehicle, b) develop a record of information related to the cotton module including at least the identifier and the information from the location system, c)store the record in a database, and d) output the information; and an identification system including at least one reader configured and operable to communicate with a data tag, the identification system being configured and operable to communicate with the communication network apparatus, store at least the identifier on the data tag, locate the cotton module as a function of the information from the location system, and associate the data tag with the cotton module;

whereby the cotton module will be identified and located for marking with an identifier as a function of the record of information representative of the locations of the cotton module and the headings of the vehicles from which the cotton module was unloaded.

2. The system of claim 1, wherein the location system automatically determines the location of the cotton module after unloading from the harvesting vehicle or transport vehicle and prior to loading on the transport vehicle.

3. The system of claim 1, wherein the location of the cotton module comprises a location of a predetermined reference point on the cotton module and the predetermined reference point is a function of the heading of the vehicle from which the cotton module is unloaded.

4. The system of claim 1, wherein the location system includes a global positioning system.

5. The system of claim 1, wherein the at least one reader comprises a radio frequency transceiver and the data tag comprises a radio frequency transponder, the transceiver being configured and operable to interrogate each transponder and receive the stored information therefrom, each transponder being configured and operable to responsively output the information stored thereon when interrogated by the transceiver.

6. The system of claim 1, wherein the at least one reader is further operable to store the record of information on the data tag.

7. The system of claim 1, wherein the data tag is associated with the cotton module by being carried on, attached to, or embedded in the cotton module.

8. The system of claim 1, wherein the data tag is associated with the cotton module by being carried on or attached to a cotton module cover.

9. The system of claim 1, wherein the record further includes information associated with the harvested cotton of the cotton module including at least some of: seed type, timing and quantity of one or more chemicals or fertilizers applied, time of harvest, yield data at time of harvest, moisture content, and harvesting location.

10. The system of claim 1, wherein the record further includes information associated with processing and classifying the cotton module and cotton processed therefrom, including at least some of: identification of a processing facility, yield data at the processing facility, seed cotton weight, lint weight, cotton grade, cotton color, cotton fiber diameter, cotton fiber strength, uniformity, and trash content.

11. The system of claim 1, wherein the record further includes information representative of identification of the harvesting vehicle, identification of the transport vehicle, time of loading the cotton module, and time of unloading the cotton module for each time the cotton module is loaded and unloaded.

12. The system of claim 1, wherein the record further includes a tracking and possession history of the cotton module developed by including information representative of identification of the vehicle from which the cotton module is unloaded and time of unloading with information from the location system for each time the cotton module is unloaded and information representative of identification of the vehicle on which the cotton module is loaded and time of loading with information from the location system for each time the cotton module is loaded, respectively.

13. The system of claim 12, wherein the user augments the record with comments.

14. A method for identifying and locating a cotton module of harvested cotton unloaded from a harvesting vehicle and transported by at least one transport vehicle prior to physically marking the cotton module with an identifier, comprising the steps of:
  providing a location system associated with a harvesting vehicle and a transport vehicle;
  automatically determining information representative of a heading of the harvesting vehicle, a heading for the transport vehicle and a location for the cotton module each time the cotton module is unloaded therefrom and loaded onto, respectively;
  providing a communication network apparatus including at least one processor;
  communicating with the harvesting vehicle, the at least one transport vehicle, the location system, and a user through a user interface;
  automatically:
    a) assigning an identifier to the cotton module when unloaded from the harvesting vehicle;
    b) developing a record of information related to the cotton module including at least the identifier and the information from the location system;
    c) storing the record in a database; and
    d) outputting the information;
  providing an identification system including at least one reader configured and operable to communicate with a data tag;
  communicating with the communication network apparatus;
  storing at least the identifier of the cotton module on the data tag;
  locating the cotton module as a function of the information from the location system; and
  associating the data tag with the cotton module;
  whereby the cotton module will be identified and located for marking with an identifier as a function of the record of information representative of the locations of the cotton module and the headings of the vehicles from which the cotton module was unloaded.

15. The method of claim 14, wherein determining the location of the cotton module includes determining the location of the cotton module after unloading from the harvesting vehicle or the transport vehicle and prior to loading on the transport vehicle.

16. The method of claim 14, wherein determining information representative of the location of the cotton module comprises determining information representative of a location of a predetermined reference point of the cotton module, and the predetermined reference point is a function of the heading of the vehicle from which the cotton module is unloaded.

17. The method of claim 14, wherein the location system includes a global positioning system.

18. The method of claim 14, wherein the at least one reader comprises a radio frequency transceiver and the data tag comprises a radio frequency transponder, the transceiver being configured and operable to interrogate each transponder and receive the stored information therefrom, each transponder being configured and operable to responsively output the information stored thereon when interrogated by the transceiver.

19. The method of claim 14, including the additional step of storing the record of information on the data tag.

20. The method of claim 14, wherein associating data tag with the cotton module includes carrying on, attaching to, or embedding in the cotton module.

21. The method of claim 14, wherein associating data tag with the cotton module includes carrying on or attaching to a cotton module cover.

22. The method of claim 14, wherein developing the record of information related to the cotton module further includes providing information associated with the cotton module including at least some of: seed type, timing and quantity of one or more chemicals or fertilizers applied, time of harvest, yield data at time of harvest, moisture content, and harvesting location.

23. The method of claim 14, wherein developing the record of information related to the cotton module further includes providing information associated with processing and classifying the cotton module including at least some of: identification of a processing facility, yield data at the processing facility, seed cotton weight, lint weight, cotton grade, cotton color, cotton fiber diameter, cotton fiber strength, uniformity, and trash content.

24. The method of claim 14, wherein developing the record includes the additional step of developing a tracking and possession history of the cotton module by including information representative of identification of the vehicle from which the cotton module is unloaded and time of unloading with information from the location system for each time the cotton module is unloaded and information representative of identification of the vehicle on which the cotton module is loaded and time of loading with information from the location system for each time the cotton module is loaded, respectively.

25. The method of claim 24, wherein the user augments the record with comments.

* * * * *